(12) United States Patent
Dultz et al.

(10) Patent No.: US 6,947,193 B1
(45) Date of Patent: Sep. 20, 2005

(54) OPTICAL PHASE MODULATOR

(75) Inventors: Wolfgang Dultz, Frankfurt am Main (DE); Heidrun Schmitzer, Cincinnati, OH (US); Leonid Beresnev, Columbia, MD (US); Gisela Dultz, Frankfurt am Main (DE)

(73) Assignee: Deutsche Telekom AG, Bonn (DE)

( * ) Notice: Subject to any disclaimer, the term of this patent is extended or adjusted under 35 U.S.C. 154(b) by 146 days.

(21) Appl. No.: 10/168,287

(22) PCT Filed: Nov. 20, 2000

(86) PCT No.: PCT/EP00/11509

§ 371 (c)(1),
(2), (4) Date: Mar. 3, 2003

(87) PCT Pub. No.: WO01/44862

PCT Pub. Date: Jun. 21, 2001

(30) Foreign Application Priority Data

Dec. 17, 1999 (DE) .......................... 199 60 936

(51) Int. Cl.$^7$ .............................. G02F 1/01; G02F 1/03
(52) U.S. Cl. ....................... 359/279; 359/245; 359/238; 359/239
(58) Field of Search ................................ 359/279, 245, 359/240, 238, 239, 246, 259, 263

(56) References Cited

U.S. PATENT DOCUMENTS 4,772,104 A * 9/1988 Buhrer ........................ 359/497
5,907,645 A    5/1999 Dupont et al. ................. 385/3
6,421,131 B1 * 7/2002 Miller ......................... 356/453

FOREIGN PATENT DOCUMENTS

DE        19852890        5/2000

OTHER PUBLICATIONS

Hariharan, P., et al., "An Achromatic Phase–Shifter Operating On The Geometric Phase," Optics Communications, NL, North–Holland Publishing Co., Amsterdam, vol. 110, No. 1/02, Aug. 1, 1994, pp. 13–17.

Martinelli, M., et al., "A Geometric (Pancharatnam) Phase Approach To The Coherent Optics Circuits," Optics Communications, NL, North–Holland Publishing Co., Amsterdam, vol. 80, No. 2, Dec. 1990, pp. 166–176.

Martinelli, M., et al., "A Universal Compensator For Polarization Changes Induced By Birefringence On A Retracing Beam," Optics Communications, NL, North–Holland Publishing Co., Amsterdam, vol. 72, No. 6, Aug. 15, 1989, pp. 341–344.

Schmitzer, H., et al., "An Experimental Test Of The Path Dependency Of Pancharatnam's Geometric Phase," Journal of Modern Optics, May 1998, Taylor & Francis, UK, vol. 45, No. 5, pp. 1039–1047.

Brunetton, R., et al. "Faraday Multipass Rotator For Use In High Accuracy Polarimetric Or Ellipsometric Devices," Applied Optics, Aug. 1, 1987, USA, vol. 26, No. 15, pp. 3158–3160.

Patent Abstracts of Japan, JP61–223822, Oct. 4, 1986.
R. Tyson, "Principles of Adaptive Optics," Boston, 1991.
S. Pancharatnam, Proc. of the Indian Academy of Sciences, A42, 1955, p. 86.
R. Bhandarj et al., Phys. Ref. Lett., 60, 1988, p. 1212 et seq.

* cited by examiner

Primary Examiner—Timothy Thompson
(74) Attorney, Agent, or Firm—Kenyon & Kenyon

(57) ABSTRACT

To provide a phase modulator for introducing a topological phase, which is designed to produce any desired phase shift between zero and 360°, the phase modulator has means, at least one double-refractive, electrooptical delay element having a rotatable indicatrix, which is/are used to direct the polarization of the light, during transmission through the modulator, over at the light one closed path on the Poincaré sphere, the indicatrix rotating in accordance with the predefined phase shift, and the total encircled surface on Poincaré sphere being equal in terms of absolute value to $\phi$.

15 Claims, 6 Drawing Sheets

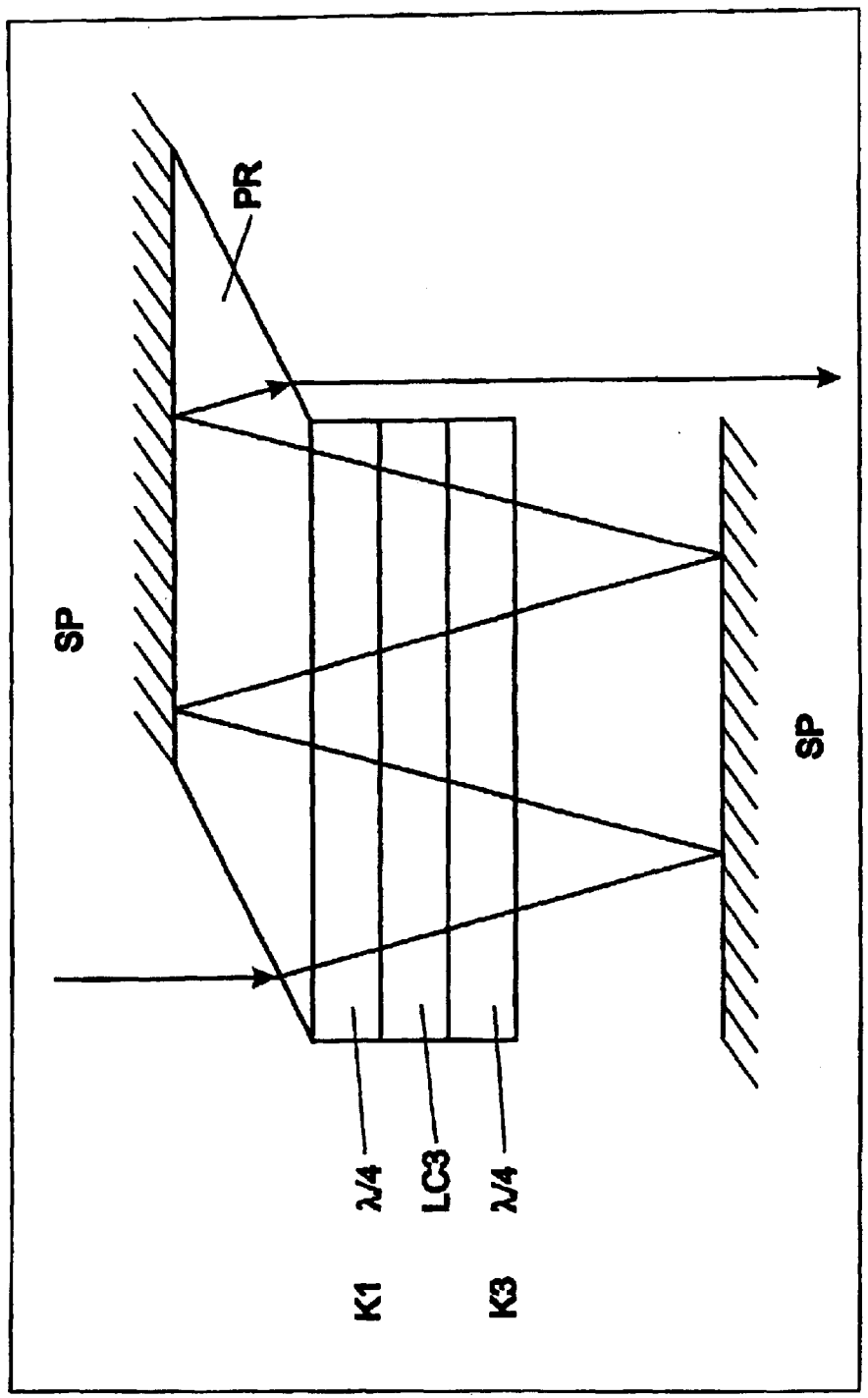

OPTICAL PHASE MODULATOR

FIELD OF THE INVENTION

The present invention is directed to a phase modulator and to a method for operating such a phase modulator.

BACKGROUND INFORMATION

Diffractive and refractive optical elements operate on the principle of the spatially dependent phase modulation of light. To ensure the modulation to fractions of the wavelength of the light, glass surfaces of the optical components used, for example, should have a high surface accuracy, which entails high manufacturing costs. Of considerable interest are, therefore, inexpensive phase modulators which correct the faulty phase fronts produced by simple optical components, by using a locally varying phase delay. Phase modulators of this kind, however, can, themselves, also be constructed as optical components, for example as lenses or mirrors. In this context, a spatially-dependent voltage is applied-at the phase modulator to change the focal distance of the lens or of the mirror. Another field of application of adaptive optics using phase modulators involves correcting refractive index fluctuations, as they occur, for example, in the atmosphere.

There are some recently developed deformable mirrors used for correcting large astronomical telescope mirrors. When a spatially resolved phase adaptation is made, piezoelectric, electric or magnetic positioning elements are used to tilt, shift or bend mirror sections or thin, deformable mirror surfaces. However, a phase adaptation of this kind entails heavy correction devices, and can be very cost intensive.

Another method for modulating the phase front of light provides for varying the refractive index of liquid crystals or dielectric crystals by applying a voltage; see, for example, "Principles of Adaptive Optics", R. Tyson, Boston, 1991. When the electrooptical effect is utilized for purposes of phase modulation, an electrical voltage is applied to change the refractive index of the medium, thereby altering the optical path length and, thus, the phase of the light measured, for example, at the output of the modulator.

Besides this modulation of the so-called dynamic phase, one may also modulate the geometric or topological phase. See S. Pancharatnam in Proc. Incl. Aceal. Sei. A42, page 86, 1955. The Pancharatnam reference may show that by changing the polarization state of the light on a closed path on the Poincaré sphere, a phase is introduced in the light path. In Phys. Ref. Lett. 60, p. 1212, 1988, the R. Bhandarj et al. reference may show that a rotatable $\lambda/4$ plate in an arm of a Michelson interferometer introduces a phase difference proportional to the rotational angle between the arms of the interferometer.

The P. Harry Haran Hareharan et al. referemce of "An Achromatic-Shifter Operating on the Geomatic Phase", Optics Communications, NL, North-Holland Publishing Co. Amsterdam, vol. 110, no. 1/02, Aug. 1, 1994, pp. 13–17, XP 000434780, may infer an achromatic phase modulator, which is constructed from a series configuration of $\lambda/2$- and $\lambda/4$ delay plates, in order to direct, in this manner, the polarization vector on the Poincaré sphere, such that different phases are compensated for various light wavelengths.

Previously available phase modulators having liquid crystals based on the topological phase are not able to provide a maximum phase shift of 360°, as is often required when a phase modulator is provided for the applications mentioned at the outset.

SUMMARY OF THE INVENTION

Embodiments of the present invention provide a phase modulator, utilizing the topological phase, which is designed to produce a predefined, adjustable phase shift within the range of between zero and 360°.

The phase modulator according to the present invention has means, at least one double-refractive, electrooptical delay element having a rotatable indicatrix, which is/are used to direct the polarization of the light, during transmission, through the modulator, over at least one closed path on the Poincaré sphere, the indicatrix rotating in accordance with the predefined phase shift. The present invention is also based on the realization of the inventors that the introduction of a topological phase is additive, up to a total phase shift of 360°, in the context of multiple rotations on the Poincaré sphere.

The phase modulator of the present invention can be able to generate an adjustable phase shift within the range of between 0 and 360°, without the mechanical shift or rotation of optical components, for example by an electrical triggering of the delay element having a rotatable indicatrix.

To produce a closed path of the polarization of the light in the phase modulator on the Poincaré sphere, besides one or more electrically controlled electro-optical delay elements, at least one double-refractive delay element may also be included, which has a definitively set, thus invariable orientation of its main axis. This lessens the demands made of the at least one delay element having a rotatable indicatrix, since it no longer needs to be the sole contributor to the looping of the polarization on the Poincaré sphere.

Further, the total optical delays produced by the delay element(s) having a rotatable indicatrix equals the total optical delays produced by the delay element(s) having a fixed orientation, since in the context of this exemplary configuration, paths are able to be set on the Poincaré sphere, which only-produce a singular surface having an area equal to zero and, therefore, do not generate any phase shift, as is required in the context of a settable, predefined phase shift equal to zero. If the total delay of all included delay elements equals a multiple of the wavelength of the light, then the polarization of the light may be looped such that the exit polarization of the light when emerging from the modulator is equal to the entrance polarization, i.e., the polarization of the light through the modulator is not changed.

In embodiments of the present invention, the phase modulator may include a $\lambda/4$ plate having a fixed orientation to the main axis at the entrance, which is positioned such that the incident light enters into the modulator with a polarization of 45° to the main axis of the $\lambda/4$ plate and is thus converted by the fixed delay plate into circularly polarized light.

Available electro-optical delay elements may be used for the delay element having a rotatable indicatrix. This refers, for example, to dielectric crystals and/or to liquid-crystal cells. In embodiments, the electro-optical delay element having a rotatable indicatrix is designed either as a $\lambda/4$- or as a $\lambda/2$-delay element, since, in this case, conventional $\lambda/4$ or $\lambda/2$ plates may be used as invariable delay elements, to obtain a total delay which is an integral multiple of $\lambda$.

To provide a spatially resolving phase modulation, the particular delay element having an electrically rotatable indicatrix, in particular, a liquid-crystal cell, may have structurally formed electrodes for the spatially resolved application of an electric field.

To provide the phase modulator according to the present invention with the fewest possible electrical components, at least one mirror may be included, which reflects the light being transmitted through the optical components of the modulator back into at least one of the optical components of the modulator, so that the light propagates through these optical components at least twice. In embodiments, the mirror is positioned such that the light is reflected back into all optical components of the modulator, and thereby receives twice the delay in comparison to propagating through once. In embodiments, with respect to providing a spatially resolved phase modulation, the light is made to always propagate through the same location when traversing the optical components in question multiple times.

The polarization may be carried out arbitrarily over the Poincaré sphere, however, it must be ensured that the light undergoes the necessary phase shift when exiting the modulator. In embodiments, geometric proportions are given when the polarization of the light is conducted on geodetic, i.e., great-circle line sections on the Poincaré sphere.

To adjust the predefined phase shift solely by introducing a Pancharatnam phase, a closed surface on the Poincaré surface may be passed through several times, the total surface being looped around on the Poincaré unit sphere being equal in terms of absolute value to the phase shift to be set. The rotation of the indicatrix in response to an applied electric voltage is directly set, in this context, such that the surface on the Poincaré sphere set by the rotation and encircled by the polarization of the light corresponds directly to the desired phase shift $\phi$, taking into account the multiple loops. It is also possible, however, that the generated phase shift is composed of dynamic and topological phase shift portions, i.e., in addition to a closed curve on the Poincaré sphere, a path section that is not closed is also included.

In embodiments, the at least one electro-optical delay element is designed and triggered such that, on the one hand, the predefined phase shift is set, and, on the other hand, the light exits the modulator again with the input polarization, i.e., the modulator does not alter the polarization of the light.

BRIEF DESCRIPTION OF THE DRAWINGS

The present invention is elucidated in the following based on the description of a few specific embodiments.

FIG. 3 shows a second specific embodiment of the present invention, including a prism and a controllable $\lambda/2$ delay element.

DETAILED DESCRIPTION

A phase modulator according to the present invention has at least one electro-optical delay element having a rotatable indicatrix. In this context, the light enters into the phase modulator, undergoes a preset phase shift during transmission through the phase modulator, and then emerges again from the same. In dependence upon the predefined phase shift $\phi$, which may amount to between 0 and 360°, in one specific embodiment, an appropriate electric field is applied via a triggering device to the electro-optical delay element having a rotatable indicatrix, for example a dielectric crystal or a liquid-crystal cell. The principle of applying an electric field to the delay element, i.e., the electric triggering device is available to one skilled in the art, and thus, it will not be explained in greater detail in the following. The electric field is applied to the controllable electro-optical delay element in such a way that the indicatrix of the delay element rotates under the influence of the electric field, thereby enabling the coarse of the polarization of the light to be preset on the Poincaré sphere during transmission through the modulator. This coarse is controlled such that at least one closed path is circulated on the Poincaré sphere, the phase shift hereby impressed upon the light being equal to half of the encircled solid angle. The phase shift to be produced by the phase modulator is thus set by the precise adjustment of the path of the polarization of the light on the Poincaré sphere.

Figure 1:
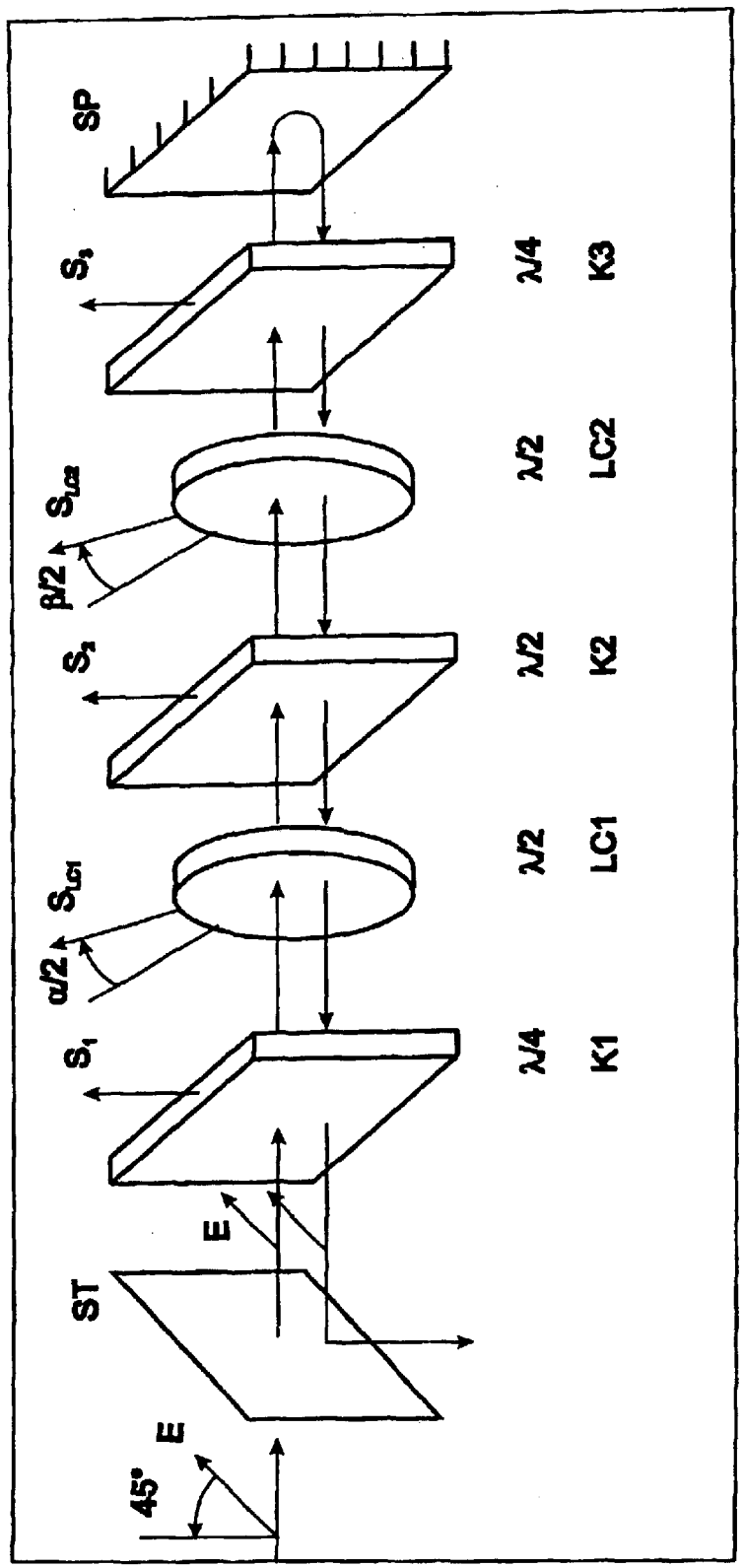
FIG. 1 shows a first specific embodiment of the phase modulator according to the present invention having two controllable $\lambda/2$ delay elements.

An exemplary specific embodiment of the present invention is shown in FIG. 1. In this context, the phase modulator according to the present invention includes all optical components drawn in the figure. Disposed downstream from a beam splitter ST is a stationary $\lambda/4$ plate K1 of quartz having a main axis S1. Positioned behind that is a $\lambda/2$ delay element in the form of a liquid-crystal cell LC1, to which an electric field may be applied by an assigned electrical triggering device (not shown), such that the main axis, denoted by $S_{LC1}$, starting from a position 45° to S1, rotates about an axis in parallel to the incident direction of the light by an angle of $\alpha/2$. A special liquid-crystal mixture was used in liquid-crystal cell LC1. The mixture and its application are described in German Patent Application DE 198 528 90, whose disclosure is fully incorporated herein by reference. The liquid-crystal elements it describes have the property of permitting indicatrix angles, i.e., angles of rotation of the main axis in the electric field of maximally about 45°. Positioned behind liquid-crystal cell LC1 is a $\lambda/2$ delay element K2, whose fixed optical axis S2 runs in parallel to S1. Following this, again, is a controllable $\lambda/2$ liquid-crystal cell LC2, which is identical to liquid-crystal cell LC1, the indicatrix being rotated by angle $\beta/2$. Positioned behind this is a $\lambda/4$ delay element K3 having a fixed orientation of main axis S3, which is disposed in parallel to S1 and S2. Subsequent thereto is a mirror, which reflects back the light being transmitted through the components in question.

Figure 2:
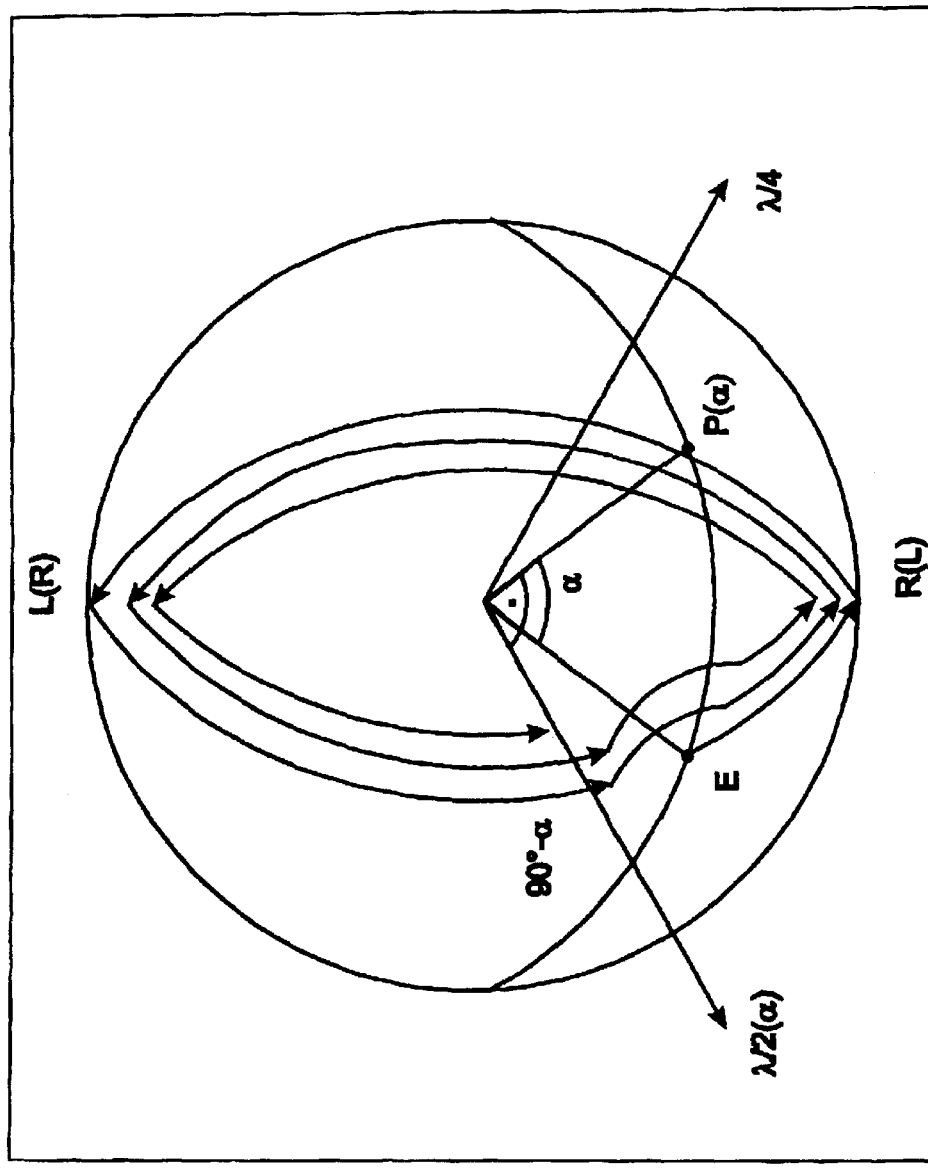
FIG. 2 shows an exemplary path of the polarization of the light on the Poincaré sphere in a phase modulator according to the present invention.

FIG. 2 depicts the path of the polarization of the light being transmitted through the modulator on the Poincaré sphere, which is passed through in response to a triggering of liquid-crystal cells LC1 to achieve a phase shift of 360°. The angle of rotation of the indicatrix to be set of this predefined phase change is 45° for both liquid-crystal cells in the specific embodiment shown in FIG. 1. Irradiation is carried out with linear polarization E; see FIG. 1. In FIG. 2, this polarization is denoted by point E on the Poincaré sphere. The light propagates through beam splitter ST and falls on $\lambda/4$ plate K1. Polarization E of the incident light is at a 45° angle to the main axis of device K1. Thus, the $\lambda/4$ plate converts the linearly polarized light into right-hand circularly polarized light, this polarization state being denoted on the Poincaré sphere by R(L), which corresponds to the south pole of the Poincaré sphere. The circularly polarized light subsequently strikes liquid-crystal cell LC1 formed as a $\lambda/2$ plate. The voltage needed to achieve the total phase shift in the modulator of 360° is applied thereto, in the present example, to adjust the rotation of the indicatrix by $\alpha/2=45°$. During transmission of the light through liquid-crystal cell LC1, the polarization state denoted by R(L) is changed to a polarization state which is denoted in FIG. 2 by L(R) and which corresponds to left-hand circularly polarized light. This circularly polarized light falls on λ/2 delay plate K2, set to be fixed, which returns the polarization of the light again to the south pole of the Poincaré sphere, i.e., to right-hand circularly polarized light. This light falls on the second controllable liquid-crystal cell, where, in response to application of an appropriate electric field, the indicatrix is rotated again by 45° out of the normal position, the normal position of main axis SC2 being 45° to S1, as in the case of LC1, see FIG. 1. Thus, the right-hand circularly polarized light is converted into left-hand circularly polarized light. Since in the described example, the particular angles of rotation α/2 and β/2 are the same, the surface looped around by the rotation on the surface of the Poincaré sphere is always defined by the same angle, e.g., α; see FIG. 2. The subsequent transmission through λ/4 delay element K3 converts the left-hand circularly polarized light again into light having the original polarization E. Downstream mirror SP reflects the light that had previously been looped twice around the Poincaré sphere back again into the optical components, so that the light, after propagating through the last λ/4 delay element K1, thereby again traces the same path twice on the Poincaré sphere. While in FIG. 2, only three round-trip passes are shown, the surface defined by angles α and β, respectively, is circulated four times in the exemplary embodiment of FIG. 1. The light subsequently strikes beam splitter ST again, which reflects the light running from right to left in FIG. 1, downwards, where it is available for further use.

In accordance with Pancharatnam, in the coarse of looping around a surface on the Poincaré sphere, the light undergoes a phase shift which is identical to half of the solid angle of the encircled surface. The phase shift is calculated as ½*(4π/360)*(α+β) for the transmission of the light from beam splitter ST to mirror SP. Taking into account that this distance is passed through twice and assuming that the indicatrix was rotated by an angle of α/2==β/2=45° in the controllable liquid-crystal cells, the result is the total phase shift φ with respect to the desired 2π, corresponding to 360°. This phase shift is conditional solely upon the Pancharatnam phase, the set-up described in FIG. 1 additionally having the advantage that the polarization of the light upon emerging from the phase modulator is identical to the polarization upon entering.

A phase shift of φ=0 is derived for the case that angle of rotation α/2 and β/2, respectively, for both liquid-crystal cells LC1 and LC2 is equal to 0, i.e., in both cases the indicatrix is not rotated. For the path on the Poincaré sphere, this signifies that the polarization of the light is altered on one single Line when passing through the various components and that no surface on the Poincaré sphere is defined, so that, consequently, no phase shift is produced by a topological phase. To ensure that the exit polarization of the light does not differ from the input polarization, even in the case of a predefined phase shift φ equal to 0, the sum of the optical delays amounts to 2*χ, which is composed of the optical delays of liquid-crystal cells LC1 and LC2 of λ/2 each and of the optical delays of the fixedly set delay elements K1, K2 and K3.

Depending on the phase shift φ to be set, the two liquid-crystal cells LC1 and LC2 are triggered to rotate their respective indicatrix by preset angles α/2 and β/2, respectively, in the described specific embodiment, these angles, i.e., the assigned electrical voltages, being stored in a memory.

In another specific embodiment of the present invention, the electrodes of the liquid-crystal cells are structurally formed, so that the phase modulation is able to be carried out as spatially resolved modulation.

FIG. 3 depicts another specific embodiment of the present invention, where the light is conducted by a prism PR between two mirrors SP in a folded configuration, four times through a settable λ/2 delay element LC3, which is positioned between two λ/4 delay elements K1 and K3 having a fixed orientation. At a single traversal, the sum of the delays is λ, so that the light, as in the specific embodiment shown in FIG. 1, is looped four times around a surface on the Poincaré sphere. The specific embodiment illustrated in FIG. 3 is distinguished in particular by a compact type of construction. However, it has the drawback that each time the light passes through, it strikes different sections of cell LC3. As a result, it is not possible to have a two-dimensional structural cell design to manipulate the transversal phase front. The optical components used are identical to equivalent ones from the first exemplary embodiment, with the limitation that they are designed for an oblique transmission of the light.

Figure 4A:
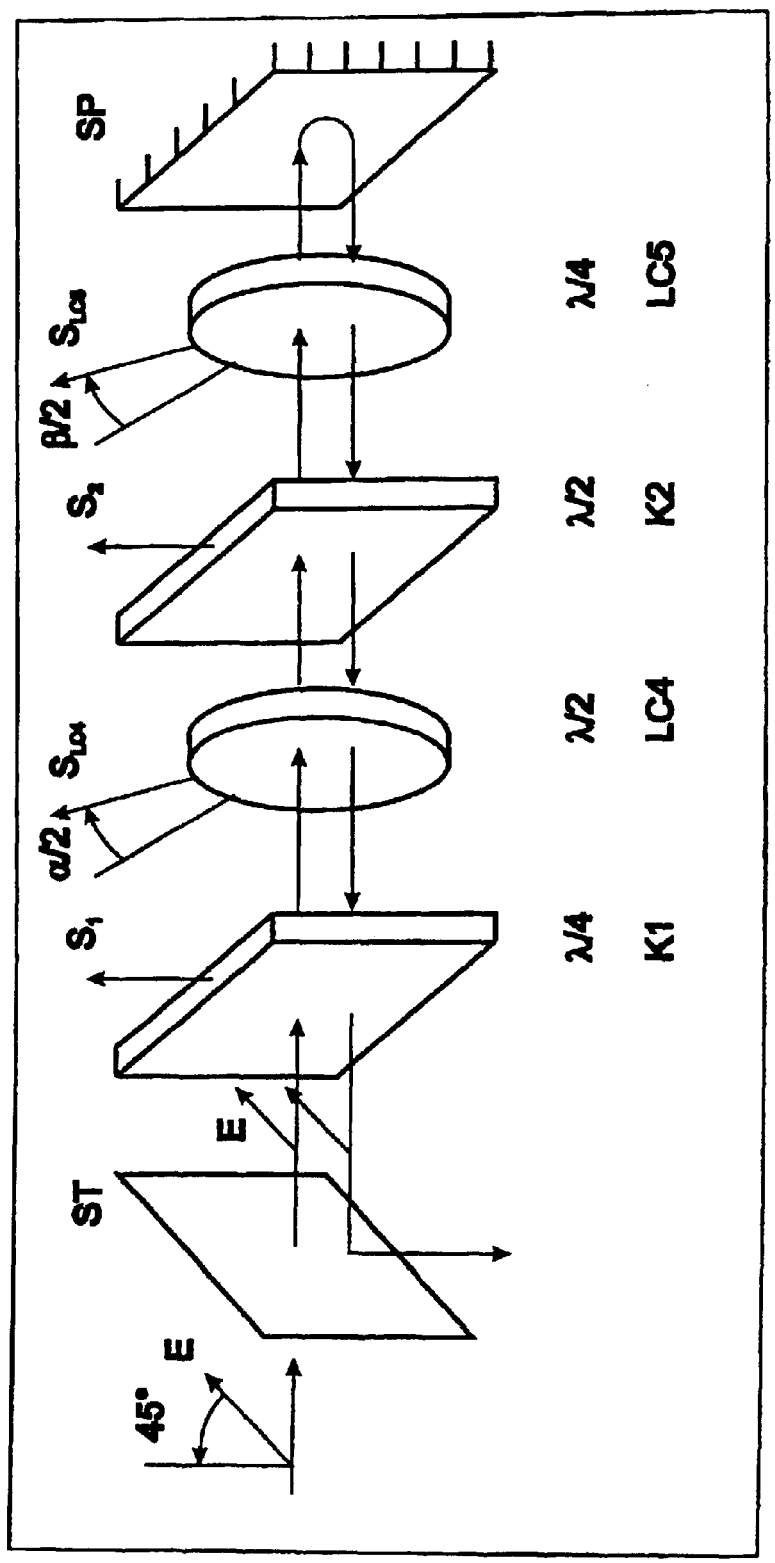
FIGS. 4a–c show further specific embodiments of the present invention, distinguished by the number of optical components used.
Figure 4B:
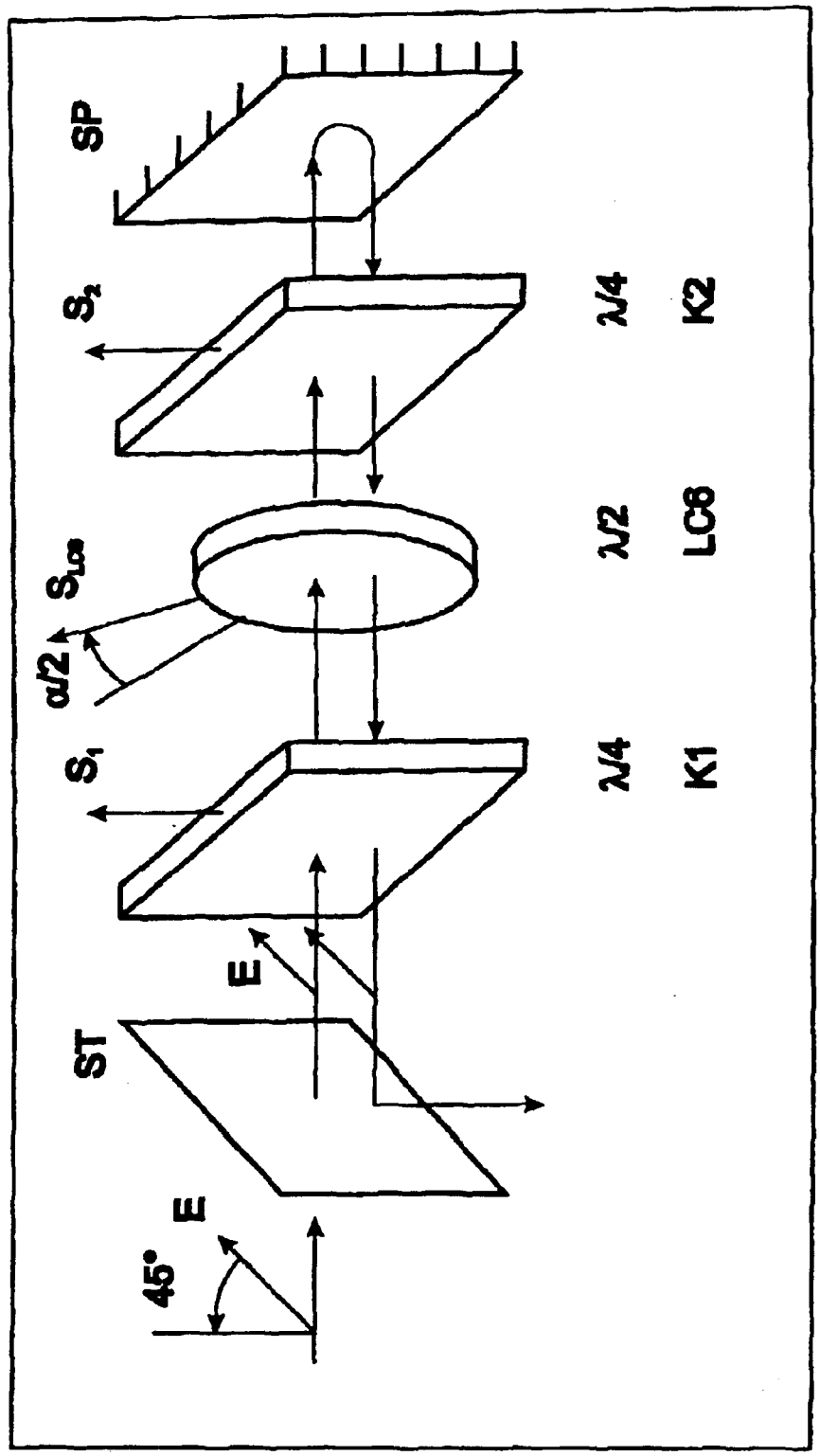
Figure 4C:
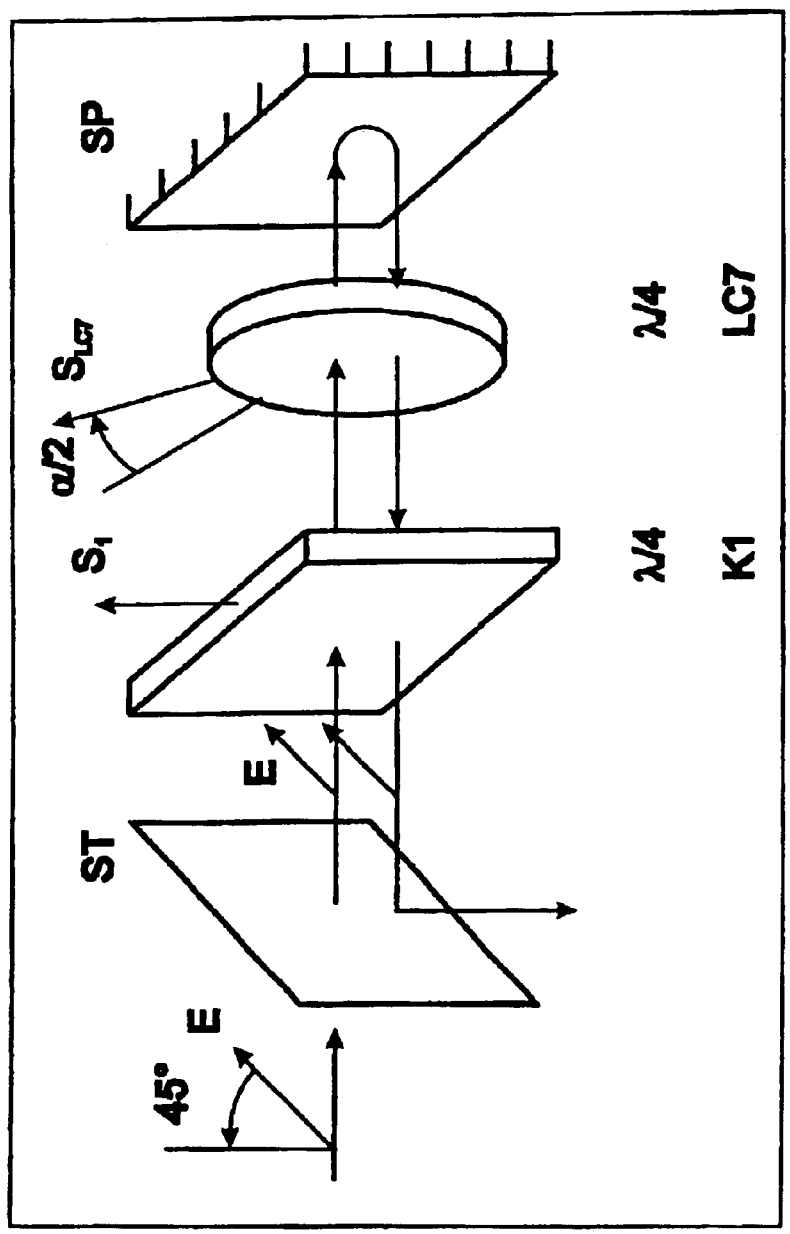

One may use cells which will provide a larger angle of rotation of the indicatrix, thereby reducing the number of delay elements needed to develop an embodiment of the present invention. Examples of this kind are illustrated in FIGS. 4a, 4b and 4c. They have the distinguishing feature of requiring fewer optical components, i.e., fewer round-trip passes on the Poincaré sphere to produce a phase shift of up to 360°. In the specific embodiment shown in FIG. 4a, the indicatrix in both liquid-crystal cells LC4 and LC5 used may be rotated maximally by 90°. In this context, LC4 is designed as a λ/2- and LC5 as a λ/4 delay element. Here, it is only necessary for the polarization of the light being transmitted through the phase modulator to be looped still three times on a closed path on the Poincaré sphere; see FIG. 2.

In the specific embodiment shown in FIG. 4b, the maximally settable rotation of the indicatrix is 120°, and the polarization of the light is only looped still two times on a closed path on the Poincaré sphere, it sufficing here to have one single λ/2 delay element LC6 having a rotatable indicatrix.

If the maximally settable angle of rotation of the indicatrix is 180°, then a phase shift may be achieved by utilizing the Pancharatnam phase, as in the specific embodiment in FIG. 4c, including a fixed λ/4 delay element K1 and a settable λ/4 delay element LC7 in the form of a liquid-crystal cell, the light, in the coarse of transmission through the phase modulator, only needing to trace one single closed path on the Poincaré sphere. As described above, given a predefined phase shift of 360°, starting from point E on the Poincaré sphere, the polarization of the light, after passing through λ/4 delay element K1, is converted into the R(L) state. After traversing λ/4 delay element LC7, the polarization is in state P(α); see FIG. 2. Once reflected off of mirror SP, the polarization of the light is transformed via state L(R) again into state E.

What is claimed is:

1. A phase modulator for changing the phase of light, which is transmitted through the phase modulator, by a predefined phase shift φ, using at least one electro-optical, double-refractive delay element (LC1, LC2, LC3, LC4, LC5, LC6, LC7) having an indicatrix that is rotatable as a function of φ, wherein at least one mirror (SP) is included which reflects the light being transmitted through the delay element of the modulator back into at least one of the delay elements, so that the light propagates through this element at least twice; and φ is any value between 0 and 360°; and means are included for directing the polarization of the light during transmission through the modulator on at least one closed path on the Poincaré unit sphere, the total encircled surface being equal in terms of absolute value to 2ϕ.

2. The phase modulator as recited in claim 1, wherein at least one further double-refractive delay element (K1, K2, K3) is included, which has a definitively set, invariable orientation of the main axis.

3. The phase modulator as recited in claim 2, wherein the sum of the optical delays of the delay elements (LC1, LC2, LC3, LC4, LC5, LC6, LC7) having a rotatable indicatrix equals the sum of the optical delays of the delay elements (K1, K2, K3) which have an invariable main axis, and the total sum of the optical delays is equal to an integral multiple of the wavelength of the light.

4. The phase modulator as recited in claim 2, wherein a λ/4 delay element (K1) having a fixed main axis is included, which is positioned before the at least one delay element (LC1, LC3, LC4, LC6) having a rotatable indicatrix, and the light enters with a polarization of 45° with respect to the main axis of the λ/4 delay element (K1) into the modulator.

5. The phase modulator as recited in claim 1, wherein the at least one optical delay element having a rotatable indicatrix (LC1, LC2, LC3, LC4, LC5, LC6) is a λ/4 or a λ/2 delay element, which is designed as an electrically controllable liquid-crystal cell.

6. The phase modulator as recited in claim 5, wherein the liquid crystal cell has at least one structurally formed electrode.

7. The phase modulator as recited in claim 5, wherein the modulator has two set-apart mirrors (SP), between which are placed two delay elements (K1, K3) having a fixed main axis, including a delay element (LC3) having a rotatable indicatrix disposed therebetween, the light propagating back and forth repeatedly at an oblique angle between the mirrors (SP) and being transmitted in each instance through the delay elements (K1, K3, LC3).

8. A method for operating a phase modulator to change the phase of light by a predefined amount n using at least one electro-optical, double-refractive delay element having an indicatrix that is rotatable as a function of ϕ, in particular for operating a phase modulator as recited in claim 1, wherein at least one mirror (SP) is provided which reflects the light being transmitted through the delay elements of the modulator back into at least one of the delay elements, so that the light propagates through this element at least twice; and the at least one delay element (LC1, LC2, LC3, LC4, LCS, LC6, LC7) is electrically triggered to rotate the indicatrix, and the polarization of the light is directed in the coarse of the transmission through the modulator at least once on a closed path on the Poincaré unit sphere, the total encircled surface being equal in terms of absolute value to 2ϕ.

9. The method as recited in claim 8, wherein the polarization of the light is conducted on geodetic line sections on the Poincaré sphere.

10. The method as recited in claim 8, wherein a loop is repeatedly traced around at least one closed surface (E, R, P, L) on the Poincaré sphere.

11. The method as recited in claim 9, wherein a loop is repeatedly traced around at least one closed surface (E, R, P, L) on the Poincaré sphere.

12. The method as recited in claim 8, wherein at least one delay element is driven such that the input and exit polarization of the light being transmitted through the phase modulator are the same.

13. The method as recited in claim 9, wherein at least one delay element is driven such that the input and exit polarization of the light being transmitted through the phase modulator are the same.

14. The method as recited in claim 10, wherein at least one delay element is driven such that the input and exit polarization of the light being transmitted through the phase modulator are the same.

15. The method as recited in claim 11, wherein at least one delay element is driven such that the input and exit polarization of the light being transmitted through the phase modulator are the same.

* * * * *